United States Patent [19]

Lewis

[11] 4,028,725

[45] June 7, 1977

[54] HIGH-RESOLUTION VISION SYSTEM

[75] Inventor: Edgar B. Lewis, Garden City, N.Y.

[73] Assignee: Grumman Aerospace Corporation, Bethpage, N.Y.

[22] Filed: Apr. 21, 1976

[21] Appl. No.: 679,035

[52] U.S. Cl. ............................. 358/103; 358/107; 358/109; 358/113; 235/61.5 E; 235/61.5 S; 356/152

[51] Int. Cl.$^2$ ........................................ H04N 7/18

[58] Field of Search .......... 358/104, 107, 109, 113, 358/103; 235/61.5 E, 61.5 S; 351/7; 356/152; 33/262

[56] References Cited

UNITED STATES PATENTS

| | | | |
|---|---|---|---|
| 3,051,047 | 9/1962 | Fieux | 33/262 |
| 3,205,303 | 9/1965 | Bradley | 178/68 |
| 3,211,045 | 10/1965 | Gerhard | 356/252 |
| 3,379,885 | 4/1968 | Nork | 351/7 |
| 3,542,457 | 11/1970 | Balding | 351/7 |
| 3,697,154 | 10/1970 | Johnson | 350/174 |
| 3,712,716 | 1/1973 | Cornsweet | 351/7 |
| 3,917,412 | 11/1975 | Stoutmeyer | 356/152 |

Primary Examiner—Robert L. Griffin
Assistant Examiner—Edward L. Coles

[57] ABSTRACT

A high-resolution vision system comprising remotely positioned image-sensing means, such as a TV camera, and a head-mounted display that is used by an observer to view the image picked up by the remote sensors. Both the sensing means and the display are servo controlled to follow the eye line-of-sight (LOS) of the observer. The eye LOS is characterized by the eye angle of the observer with respect to his head plus the head angle with respect to a reference axis, such as the center line of an aircraft. Because the display follows eye motion by means of a servoed mirror or beamsplitter in front of the eye, the eye always looks at a fixed point on the display. The resolution of the display preferably is increased on the LOS so that the display characteristics closely match the eye, i.e., high resolution on the eye LOS and lower resolution in the peripheral region. This preferably is accomplished by using dual sensing means, such as dual TV cameras, one with a wide and the other with a narrow field of view. The output from these sensing means is processed by head-mounted cathode ray tubes, then optically combined with preferably a 1:1 magnification, and projected into the eye by means of the servoed beamsplitter. In a further embodiment of the invention, the sensing means can be a computer, resulting in optical images that appear fixed in space. Alternately, the computer-generated images can follow head motion.

10 Claims, 11 Drawing Figures

ACTUAL INSTRUMENT PANEL

FIG.9A

INSTRUMENT PANEL AS VIEWED THROUGH THE HELMET-MOUNTED DISPLAY

FIG.9B

HIGH-RESOLUTION VISION SYSTEM

BACKGROUND OF THE INVENTION

1. Field of the Invention

The present invention relates to high-resolution vision systems and more particularly, to a helmet-mounted display system in which remotely located sensors controlled by head and eye tracking means generate signals that are transmitted to signal-processing means on the helmet to produce a display image having a wide field of view with an area of high resolution that is maintained on the operator's line of sight.

SUMMARY OF THE INVENTION

Systems have been proposed for remotely viewing a scene by means of a closed-circuit television system or the like. Some of these prior art systems have included automatic means for remotely controlling various parameters such as pointing direction, focus, and the like, of the remote sensor or real-time transducer of the system thereby to effect some change in the scene produced on a display at the remote location. Attempts have been made in the past to coordinate the movement or control of the remote sensor with the movement of the remote observer's head or eyes. These systems of the prior art have the disadvantage that they often disorient the observer or result in a display having low resolution. These and other disadvantages of the prior art systems have made them largely inapplicable for tasks of any complexity such as the piloting of high-speed aircraft, particularly during the take off, landing, and low-level operations thereof.

2. Description of the Prior Art

The prior art discloses a number of examples of head- or helmet-mounted display systems in which it is proposed to re-create on a display viewed by an observer a scene picked up by a remotely located sensor or real-time transducer such as a television camera or radar apparatus. These prior art systems, namely those disclosed by J. H. Hickey (U.S. Pat. No. 2,711,594); A. N. Stanton (U.S. Pat. No. 3,059,519); W. E. Bradley (U.S. Pat. No. 3,205,303); and F. H. S. Rossire (U.S. Pat. No. 3,614,314), have certain similarities with the present invention in that they have a closed-circuit television or the like viewing system having means to present an image transduced by remote sensors to a helmet-mounted display. Unlike the case in the present invention which employs both head and eye tracking techniques and servo means to center substantially on the line of sight an image having a high resolution portion duplicating closely the visual characteristics of the human eye; Hickey, Bradley, and Rossire, use a head tracking technique and their displays present an image of substantially uniform resolution. The display viewed by the observer lacks, therefore, essential visual characteristics that largely prevents them from attaining a natural, realistic display image. Also, in that they do not use both head and eye tracking to control the line of sight, these prior art systems would be substantially unusable in high-speed vehicles such as, for example, by the pilot of an aircraft for the landing and takeoff phases of flight or for terrain avoidance, because of the motion sickness and spatial disorientation they induce. Stanton, in addition to not teaching head and eye tracking, provides no showing of means to maintain the remote sensor on the observer's line of sight.

Admittedly, prior art apparatus have provided servo-controlled means sensitive to either head or to eye movement for controlling various devices such as weapons relative to a line of sight, but there is no showing in the prior art in which both head and eye tracking techniques have been combined to realize the enhanced performance of the apparatus embodied in the subject invention. Prior art showings of head-tracking techniques include U.S. Pat. Nos.: R. Brown (2,312,954); L. G. Dorsette (3,824,304); H. A. Wagner et al. (3,161,846); H. L. Shapiro et al. (3,262,210); W. R. Bains et al. (3,290,985); R. A. Farrar (3,633,988); M. H. Freeman (3,666,887); J. C. McKechnie (3,699,248); and R. G. Stoutmeyer et al. (3,917,412), and showings of eye-tracking techniques include: C. L. Nork (3,379,885); K. A. Mason (3,462,604); W. S. Holmes (3,507,988); T. N. Cornsweet et al. (3,712,716); and T. N. Cornsweet et al. (3,724,932).

In these prior art showings, however, only Holmes discloses an image display system having a high-resolution portion maintained on the line of sight of the operator by servo means. To enhance the realism of the display viewed by the operator and to avoid control instabilities, motion sickness, and spatial disorientation should the display be used for vehicle guidance in a high-speed environment, both helmet and eye movements should be tracked to maintain high resolution on the line of sight together with a wide field of view background. Because Homes uses only eyetracking and, in addition, uses only a single remote sensor or television camera in which scan control means are used to generate a high-resolution image on the line of sight on a degraded wide field of view, the apparatus of Holmes thus suffers the disadvantages of the prior art that the subject invention overcomes.

OBJECTS OF THE INVENTION

It is thus a principal object of this invention to provide a display system in which the visual display or presentation has high and low resolution areas that closely approximate eye resolution and which incorporates servo-control means to keep the area of high resolution approximately centered on the viewer's line-of-sight (LOS) such that the visual characteristics of the display very nearly match the human eye to thereby avoid the degradation in the visual quality of the display systems in the prior art.

It is also an important object of this invention to provide a display system whose visual quality closely approximates the human eye such that realism of the display is enhanced.

Other and further objects of the invention will become apparent from the detailed description of the invention given in the accompanying Specification and drawings.

DESCRIPTION OF THE DRAWINGS

For the purposes of illustrating the invention, there is shown in the drawings, the forms which are presently preferred, it should be understood, however, that the invention is not necessarily limited to the precise arrangements and implementation here shown.

DESCRIPTION OF THE PREFERRED EMBODIMENTS

Referring now to FIGS. 1–6, there is shown an illustrative embodiment of the invention in a helmet-mounted display for a pilot of a high-speed aircraft. It will be understood, of course, that an aircraft environment is given by way of example only since the system can be used in other applications.

Figure 1:
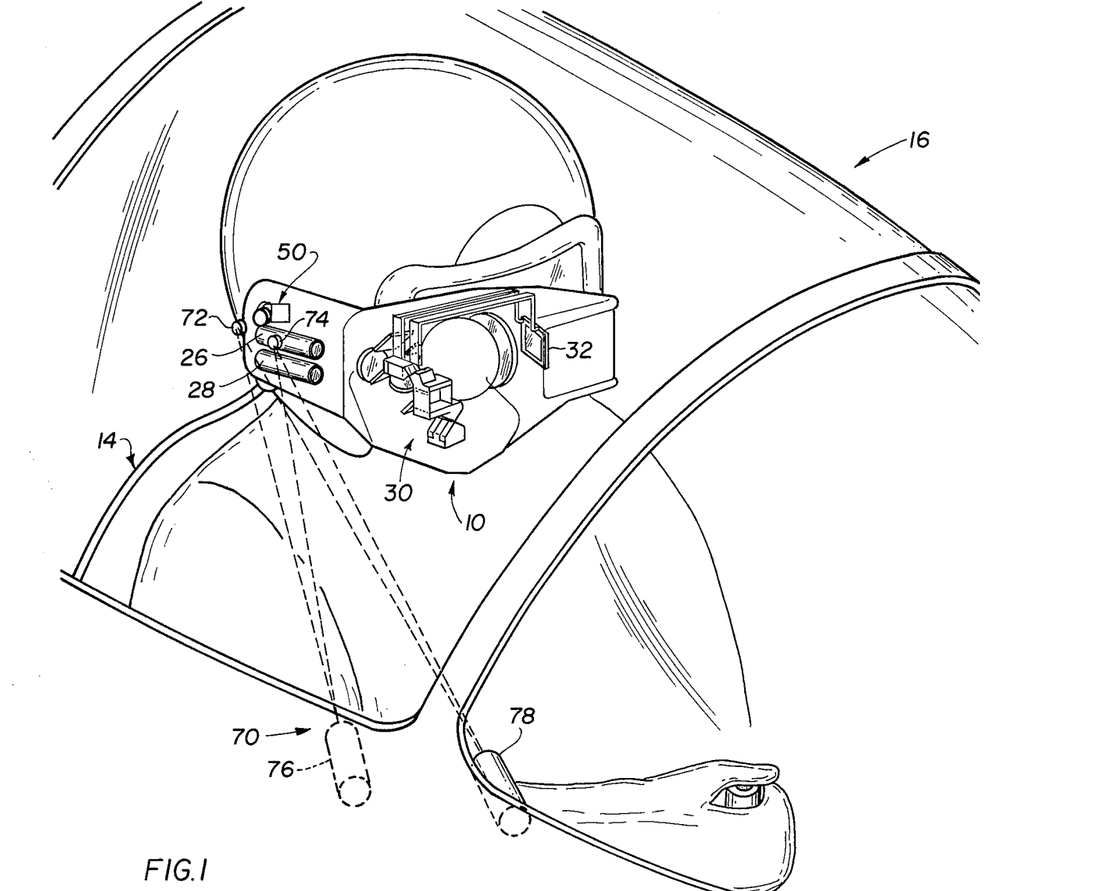
FIG. 1 is a diagrammatic perspective view of an embodiment of the helmet-mounted display of high-resolution system of the invention.
Figure 2:
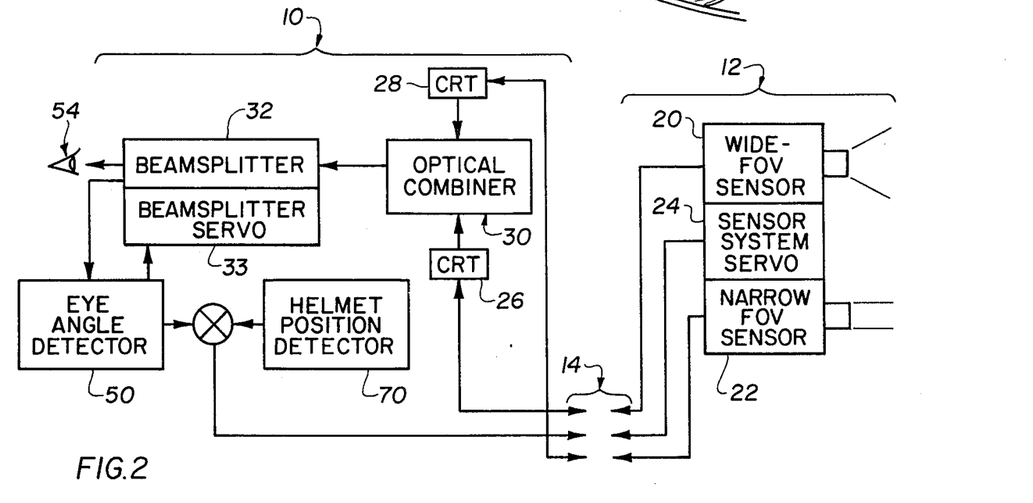
FIG. 2 is a diagrammatic illustration of an embodiment of the system of the invention.

In aircraft applications, the sensor system 12 can be located in a suitable position in the aircraft 16 such as the nose 18 thereof. The sensor system comprises a wide field of view (FOV) sensor 20, preferably with a FOV of 25°; a narrow FOV sensor 22, preferably having a FOV of 5°; and a servo-driven tracking system 24, for aiming the sensors in a direction related to the pilot's line-of-sight (LOS). For optimum performance, a high-speed servo system for the sensors is preferred. Such a high-speed servo would have a slew rate of approximately 1000° per second maximum and an acceleration capability of approximately 40,000° per second$^2$. It will be understood, of course, that the FOVs of the sensors will be selected to suit the requirements and can vary from the values given. Sensors 20 and 22 can be of any suitable known types such as, for example, television cameras or similar electro-optical apparatus, and the like. As is known, the electro-optical apparatus can be the type operating in any selected frequency range of the electromagnetic spectrum and the infrared (IR) frequencies as well as the "visual" frequencies can be utilized.

The presentation input to display 10 can be provided by other means whose signal input can be coordinated with or, if desired, replace the input of the sensor system 12. As is known, the input to the display can also be computer-generated imagery or the input signals can be image information transduced by suitable known pick-up means from a "storage" means such as, for example, magnetic tape. Any known conventional system such as, for example, the one described and explained in U.S. Pat. No. 3,449,721, Graphical Display System, M. L. Dertouzos et al., Inventors, can be used as the source of symbolic images for the display. One of the teachings of that patent is a command program generator operating in real time in response to input data. The command program in the referenced patent may be regenerated from a software program translator as is well known in the art. It is also known in this type of helmet-mounted display system to superimpose on the image being viewed on the LOS of the pilot a reference symbol such as a gunsight reticle which the pilot can align with a target for weapons delivery and the like. A further conventional teaching of apparatus for generating symbolic images for the display is disclosed in the G. Wolfson et al. patent, U.S. Pat. No. 3,885,095, for a Combined Head-Up Multisensor Display. As described in that patent, the symbolic display source includes a solid-state read-only memory which is programmed with the symbols that will be interposed on the display. The memory is connected to a computing circuit which generates signals supplying added information to the symbols in accordance with input data from remote sensors.

Figures 3, 4:
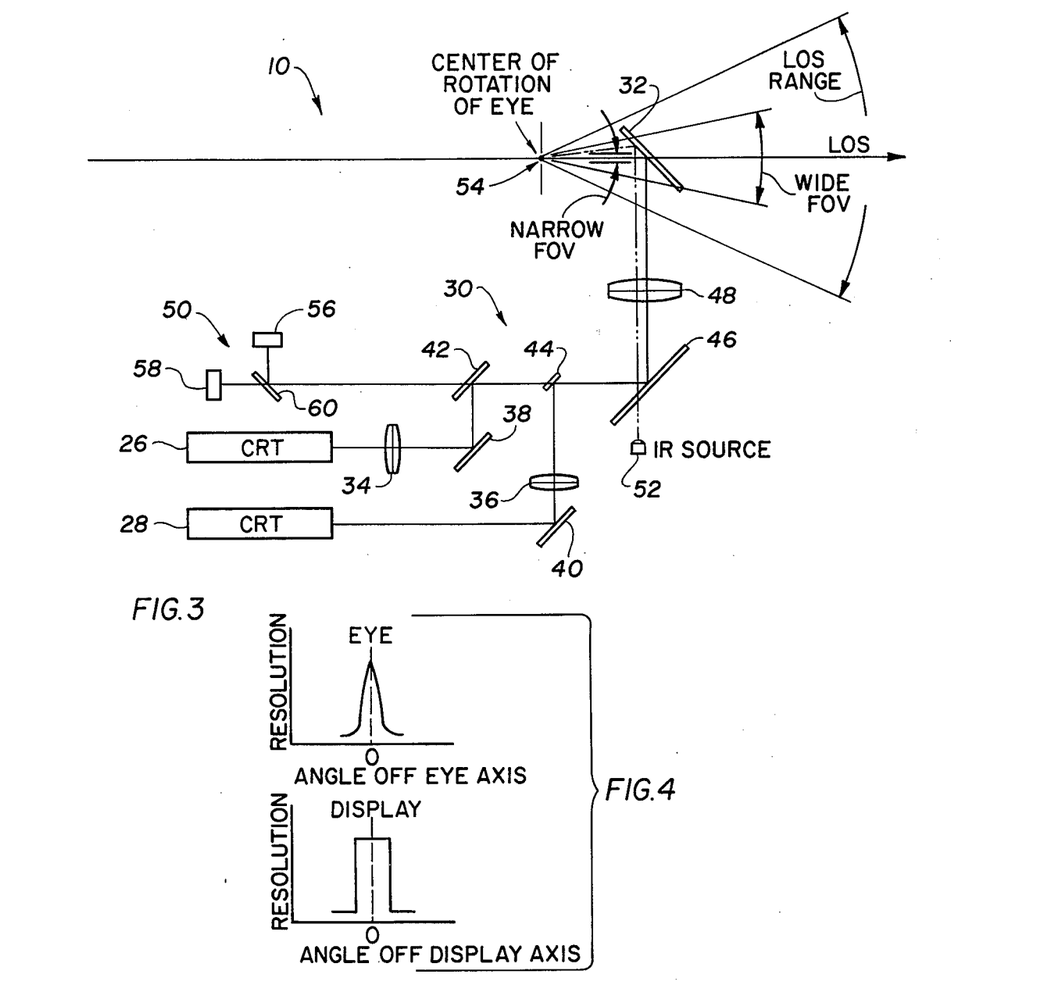
FIG. 3 is a diagrammatic illustration of the electro-optical elements of a display embodied in the invention.
FIG. 4 is a plot of parameters of the human eye compared with identical parameters of the display embodied in the invention.

Helmet-mounted display 10 comprises means for presenting imagery generated by the sensor system 12 and/or a computer (not shown) with an area of relatively high resolution of the image substantially on the operator's LOS and means for detecting the LOS and generating signals for maintaining the high resolution area of the presented image approximately on the LOS. The image presenting means comprises suitable means such as cathode ray tubes (CRTs) 26 and 28 for protecting images in accordance with signals generated respectively by the wide FOV sensor 20 and the narrow FOV sensor 22, suitable collimating and combining optics 30, and a servoed beamsplitter 32. (As described previously, the input to the CRTs can be generated by a computer or other suitable means.) As also described previously, the FOV of sensor 20 is, for example, 25 degrees, and sensor 22 is, for example, 5 degrees. Preferably, also, the optics 30 comprise CRT lenses 34, 36; folding mirrors 38, 40; dichroic mirrors 42, 44; folding mirror 46; and lens 48. Beamsplitter 32 is angularly adjusted relative to the operator's eye by suitable servo means 33 in response to error signals generated by an eye-angle detector 50 to maintain the area of high resolution of the image substantially on the operator's LOS. For optimum performance, a high-speed servo system for the beamsplitter is preferred. Such a high-speed servo would have a slew rate of about 600° per second maximum and an acceleration capability of approximately 40,000 degrees per second$^2$.

CRTs suitable for use in the present invention are in widespread commercial use and a further description thereof is believed not to serve a useful purpose and will not be given. Typically, suitable CRTs have 800 lines of resolution and versions producing pictures in black and white or in field sequential color are commercially available and can be employed.

In this invention, dual sensors, one having, for example, a 25° FOV and one with a 5° FOV, generate the signal input to the CRTs 26, 28 to produce the image for the display. The picture projected by CRT 26 operatively associated with the wide-FOV sensor 20 passes through collimating lens 34 and is reflected by mirror 38 to the partially reflective dichroic mirror 42 and is then reflected to mirror 46, as perhaps best shown in FIG. 3. The picture projected by CRT 28 operatively associated with narrow-FOV sensors 22 is reflected by mirror 40 and is reduced optically by lens 36 and passes to the partially reflective dichroic mirror 44 and is then reflected to mirror 46. Dichroic mirror 44 is sized to be large enough to reflect the reduced narrow-FOV image and block the central portion of the wide-FOV image reflected off dichroic mirror 42. Using this arrangement, the image incident on mirror 46 will be a combined image consisting of the high-resolution narrow-FOV image which is inserted by mirror 44 into the center of the wide-FOV image reflected by mirror 42. It will be understood, of course, that other known optical means can be used to combine the images. This combined image is reflected off mirror 46 through lens 48 to servoed beamsplitter 32 which reflects the combined image to the eye of the observer. Increasing the resolution on the eye LOS results in a better match between the eye resolution and the display, as shown in FIG. 4. Both the eye and the display in this invention have a high resolution central area accompanied by a lower resolution peripheral area. The actual resolution of the display in this invention with appropriate sensor inputs is designed to be substantially equal to that of the human eye. The images seen by the eye appear normal and, in aircraft use, should eliminate pilot disorientation or sickness. Preferably, a uniform 1:1 magnification is used over the entire dual-resolution display to enhance the realism thereof.

Figure 5:
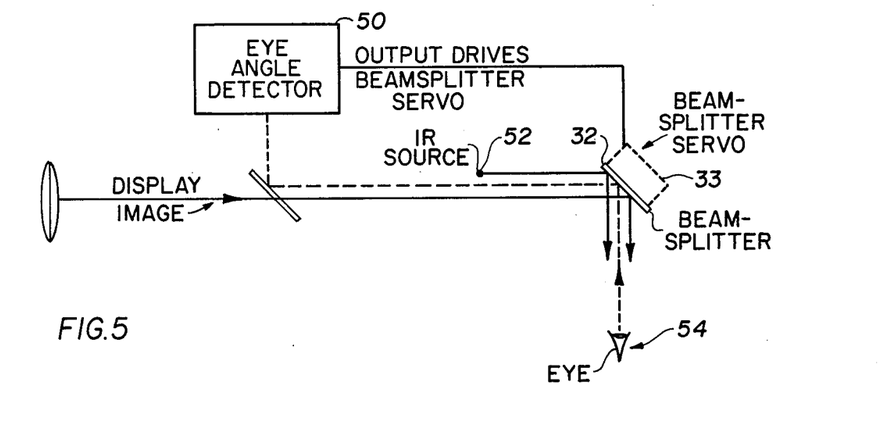
FIG. 5 is a diagrammatic illustration of an eye tracker embodied in the invention.
Figure 6:
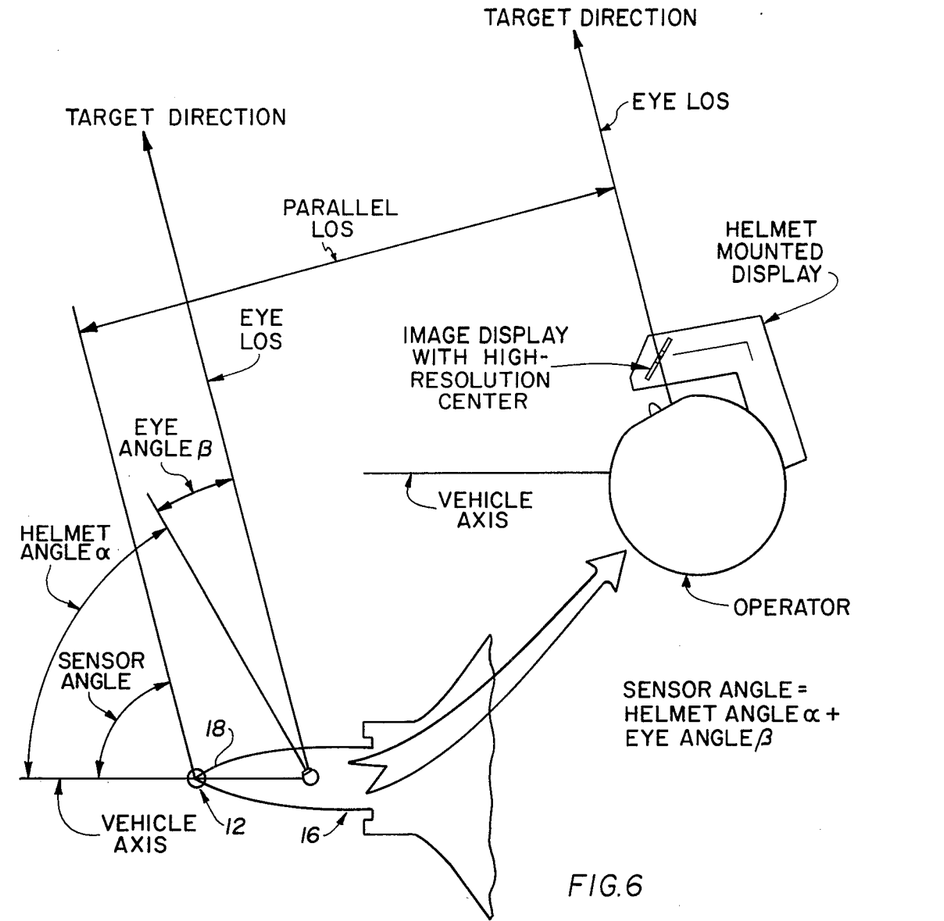
FIG. 6 is a schematic diagram of the geometrical relationships embodied in the invention.

Eye-angle detector 50 is utilized to generate the input signals to the servo-means of beamsplitter 32 to adjust it accordingly such that the high-resolution area of the display is maintained substantially on the eye LOS of the operator. A number of techniques for determining the eye angle are known, however, a technique using harmless, low-power invisible IR directed into the eye and imaging the reflections from within the eye is preferred. Such technique is disclosed in U.S. Pat. No. 3,724,932, Eye Tracker and Method, to T. N. Cornsweet et al. The technique uses the first Purkinje image, formed by the radiance reflected from the front surface of the eye, together with the fourth Purkinje image formed by radiance reflected from the rear surface of the eye's lens. These images change their relative spacing when the eye is rotated, yet remain fixed in relative spacing during translation of the eye position with respect to the axis of the optical system. Thus, by monitoring the position and spacing of the first and fourth Purkinje images, unambiguous eye LOS information can be obtained.

In the implementation in the subject invention (FIGS. 3 and 5), a low-power beam from a suitable IR source 52 is directed to the operator's eye 54 via the servoed beamsplitter 32 positioned in front of the eye. An IR-emitting diode can be used as the radiation source. Such commercially available diodes provide radiance at approximately 0.9 microns, which is sufficiently removed from the 0.4 to 0.7 micron visual spectral region to avoid any interference with the visual display. It will be appreciated that, if the eye looked directly at the IR source, the two Purkinje images will be superimposed. To prevent this possibility, the optical path for the displayed image is offset from the IR path by a fixed angle. Maintaining the IR source offset at this fixed angle relative to the eye LOS, automatically centers the displayed image on the eye LOS.

Error detecting means in the eye angle detector 50 are provided for determining the position of the first Purkinje image $P_1$, formed by the front surface of the eye and the fourth Purkinje image $P_4$, formed by the rear surface of the eye lens. These images are spaced and oriented with respect to one another as a function of the off-axis position of the IR source relative to the eye LOS. For a fixed off-axis IR source, the spacing between the two Purkinje images and their orientation are dependent on the angular position of the eye. The spacing is controlled to the values at which the servoed beamsplitter aligns the optical system axis parallel with the eye LOS.

Realignment of the servoed beamsplitter in response to changes in the eye LOS indicated by the alignment of the Purkinje images is effected by the output from eye angle detector 50. The detector comprises a pair of suitable silicon quadrant IR or dual axis continuous position sensing photodiodes 56 and 58 operatively associated with $P_1$ and $P_4$, respectively. Physical interference between the two photodiodes is prevented by a beamsplitter 60 which optically separates them. The first Purkinje image, $P_1$, is two orders of magnitude brighter than the fourth image, $P_4$, and is closer to the eye axis. Thus, since $P_1$ is approximately 100 times brighter than $P_4$, the photodiode 56 operatively associated with $P_1$ can be selected such that its spectral response is not unduly influenced by the $P_4$ image. The image $P_1$ is blocked so that it is not incident on the photodiode 58 associated with $P_4$ when the $P_1$ photodiode is nulled. Positioning of the servoed beamsplitter in response to the outputs of photodiodes 53, 58 is as follows: Assume that the eye is looking straight ahead and that the collimated IR beam is at an angle, $\Delta$, with respect to the eye LOS. Now let the eye rotate through some angle, $\theta$, the Purkinje images may be laterally displaced relative to their original position and may also change in spacing. Only the change in spacing is needed. The lateral motion, however, results in the images moving on the photodiodes. This motion results in an error signal output to servo 33 which moves beamsplitter 32 accordingly to keep image $P_1$ fixed on photodiode 56. With the image of $P_1$ fixed, any motion of image $P_4$ on photodiode 58 represents a change of spacing and, therefore, an angular change indicates that the beamsplitter is not correctly positioned. Motion of the image on photodiode 58 generates an error signal which causes the serve to adjust the beamsplitter such that the angle between eye LOS and the IR beam once again equals $\Delta$.

In addition to tracking eye position, a helmet-position detector 70 is utilized to monitor helmet/or head movement. Any suitable known helmet-position detector which produces electrical output signals as a result of helmet angular displacement can be utilized. A representative example of such suitable tracking means is that taught by R. G. Stoutmeyer et al. in U.S. Pat. No. 3,917,412, Advanced Helmet Tracker Using Lateral Photodetection And Light-Emitting Diodes. In such system, at least a pair of suitable light-emitters 72 and 74 mounted on the helmet are used in conjunction with at least an associated pair of photodetectors 76 and 78 fixedly mounted forward of the observer on structure such as the aircraft cockpit. In addition, a simple known computer (not shown) is provided to process the outputs from the photodetectors.

In operation, light emitted from emitter 72 is detected by detectors 76, 78, which respectively measure direction-cosines to emitter 72. Since the orientation of the detectors is known and the direction-cosines from each detector to emitter 72 is measured, the plane including the point occupied by emitter 72 and detectors 76, 78 can be determined by mathematical analysis performed by the computer in a known manner. Likewise, the plane containing the points occupied by emitter 74 and the detectors can be determined. By performing its programmed mathematical computations, the computer describes and locates the orientation of the helmet relative to some reference axis which can be the longitudinal axis of the aircraft.

It will be seen that the eye angle detection system acts to slave the beamsplitter 32 and, therefore, the center (or another predetermined area) of the display image on the eye LOS. The beamsplitter angles, which are related to eye angles, are measured by suitable known transducers (not shown) located on the servo drive mechanism 33 to provide necessary command and feedback functions, as is well known in the art. The Purkinje images can be moved, as described, by angular movement of a servoed mirror or, alternately by other known means such as by the use of a matching pair of rotating Herschel wedge prisms. Further, the electrical signal output from the eye angle detection system and the electrical signal output from the helmet position detector system 70 are combined and are transmitted to the sensor system servo means 24 to also slave the sensor system 12 to the eye LOS.

A common problem with conventional helmet-mounted displays is the "smearing" of the image being viewed because of relative motion between the display and the eye such as would be caused by the helmet slipping, vibration, and the like. In this invention, helmet slippage and head relative movement do not result in an angular error in either the pointing of the remote sensors or in the position of the displayed image that would cause smearing. This is due to the fact that helmet slippage or other relative motion results in a helmet angle change which is accompanied by an equal and opposite eye angle change with respect to the helmet, see FIG. 6. It will be seen that the sum of the two changes, which provides the signal to drive the servo of the remote sensor 12, does not change. Therefore, the sensor pointing does not change. Although movement of the display image occurs because of the eye angle change the amount and direction of the change is exactly what is required to keep the displayed image centered on the eye LOS. In other words, in the normal situation, the sensor will point to the sum of the helmet angle and eye angle, $\alpha+\beta$, and the display will be centered on $\alpha+\beta$; if the helmet should slip through an angle of $\delta$, the sensor pointing direction will be $(\alpha-\delta) + (\beta+\delta) = (\alpha+\beta)$ and both the display and the sensors will remain on the LOS $(\alpha+\beta)$.

Figure 7:
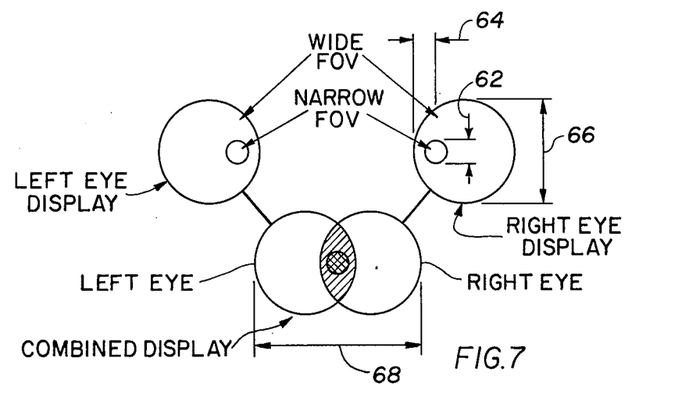
FIG. 7 is a diagrammatic illustration of the field-of-view of monocular and binocular embodiments of the invention.

It will be recognized that the instantaneous FOV can be significantly increased by incorporating two displays, one for each eye, in the observer's helmet such that binocular capabilities will be provided. In a binocular system, the high resolution area 62 of the display is preferably offset 64 from the center of the low resolution area of the display, as shown in the upper portion of FIG. 7. When both eyes focus on an object, the resulting combined display, illustrated in the bottom portion of FIG. 7, with an offset 64 of approximately 5 degrees, has a horizontal instantaneous FOV 68 of 40°, assuming the narrow FOV 62 to be 5° and the wide FOV 66 to be 25° for both a monocular and a binocular system.

In operation, assuming the invention to be embodied in a helmet-mounted display being used by the pilot of an aircraft, the pilot looks at a target or other area of interest. The IR source 52 of the display system 10 directs a beam of IR radiance through beamsplitter 32 into the pilot's eye 54. The first and fourth Purkinje images are passed to eye angle detector 50, which detects the alignment of the eye with respect to the IR source. Appropriate error signals are generated to drive servo 33 to adjust beamsplitter 32 to re-align the IR source with respect to the eye. This action also aligns the display with the eye LOS. The beamsplitter angle thus determines eye angle. Concurrently, light from emitters 72, 74 is monitored by detectors 76, 78 of the helmet position detector system 70 and the output signals therefrom are summed with the output signals from eye angle detector 50 and are used to slave the servos 24 of the remote sensors 20, 22 to align them with the LOS of the pilot. The output signals from the remote sensors are passed to the CRTs 26 and 28, which project imagery of the scene viewed by the sensors through optics 30 and the beamsplitter 32 to thus present to the pilot's eye an image duplicating that which would appear on the LOS.

The scene imaged on the display will appear directly in front of the pilot's eyes and will shift with movement of his head and eyes. This factor, coupled with the high resolution center of the displays on the LOS, and the 1:1 magnification of the system, will impart to the pilot a feeling of realism. The remote sensors can be mounted in the aircraft in positions other than in the nose. Two or more sensor systems can be used and can be located on the aircraft such that obstructions in the line of sight such as would be caused by the wings or other structure can be prevented merely by automatically switching to sensors having an unobstructed view.

The vision system embodied in this invention has the capability of producing image displays of high visual quality. It will be appreciated that a multi-sensor design also has stereoscopic capabilities for achieving the imaging of views in three dimensions. In such embodiment, a binocular helmet-mounted display would be provided and two pairs of remote sensors, such as TV cameras, would be used to pick up different views of the remote scene for use with the display for each of the observer's eyes. Stereoscopic systems are well known and it is not believed that any useful purpose will be served in a further description thereof. It is also known in such systems to produce images in color and a field sequential color television system with a rotating color wheel for each cathode ray tube is entirely practical.

In an alternate embodiment, the sensors 20, 22 can be located in an aircraft at the position normally occupied by the pilot's head. An operator on the ground can be provided with suitable known remote controls for the aircraft and the communications link 14 between the aircraft sensors and the operator's display can be by means of radio. Thus, in remotely controlling the aircraft from the ground, the operator will see exactly the view he would have if he were actually present in the cockpit of the aircraft. Other uses for an embodiment of this nature are for simulators for flight training, remote manipulators, for driving a tank, and the like.

Telescopic vision can be obtained in this invention by displaying the signal output from the narrow FOV sensor 22 on the CRT 26 which normally displays scenes from the wide FOV sensor 20. The output from the wide FOV sensor normally used with CRT 26 will be inhibited, of course, in this case. This technique will yield approximately a 5:1 magnification.

Figure 8A:
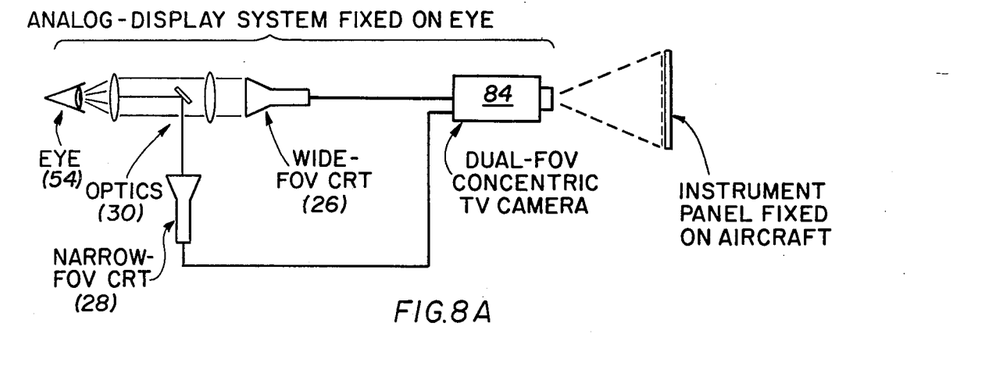
FIG. 8A is a diagrammatic illustration of an analog of a further embodiment of the system of the invention.
Figure 8B:
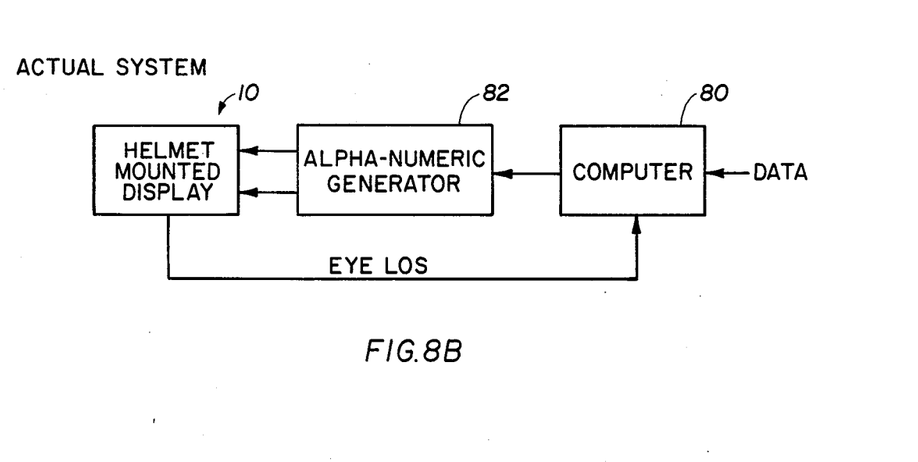
FIG. 8B is a diagrammatic illustration of the implementation of the embodiment of FIG. 8A.
Figure 9A:
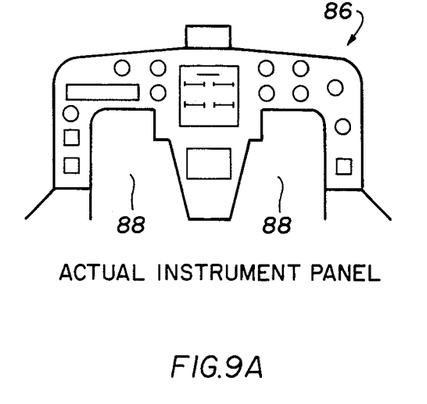
FIG. 9A is a front elevation of a conventional aircraft instrument panel.
Figure 9B:
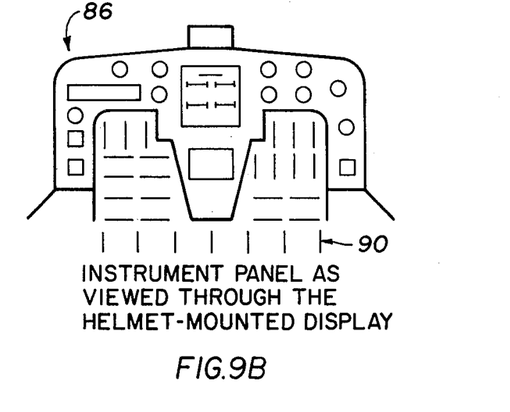
FIG. 9B is a front elevation of the instrument panel of FIG. 9A when viewed through the display system embodied in FIGS. 8A and 8B.

As in conventional helmet-mounted displays, the display system embodied in the subject invention can display computer-generated imagery (CGI). The image can be displayed in accordance with known prior art techniques or, advantages can be taken of the unique capabilities of the subject invention to create images that appear fixed in space. A mode of image presentation which closely approximates an aircraft cockpit display can be readily implemented with the present system. An analogy of the implementation of this type of display system in which the CGI instruments appear to be fixed to the aircraft is shown in FIG. 8A. As shown in FIG. 8B in the actual implementation of the embodiment, a computer 80 and an alphanumeric generator 82 of suitable known types are used instead of the dual-FOV TV camera 84 to generate display information which appears to be fixed on the instrument panel. To see a specific instrument, the pilot merely looks in the direction in which the instrument is "located". To avoid superposition of images when both CGI and the sensing system 12 are being used concurrently, as is well known in the art, the computer can automatically choose between the sensor signals and the CGI signals. This type of display can be applied advantageously to the instrument panel 86 in the cockpit (not shown) of a highly maneuverable — "high-gravity" (high-g) aircraft. In a typical high-g cockpit, an articulating seat (not shown) is used to alleviate the effect of gravity on the pilot. The area normally containing instruments and displays is significantly reduced by the space 88 that has to be provided to accommodate the pilot's legs when in the supinated position (FIG. 9A). As illustrated in FIG. 9B, this space can be recovered for display use by locating the images 90 of the computer-generated displays in that area.

Although shown and described in what is believed to be the most practical and preferred embodiments, it is apparent that departure from the specific process and apparatus described will suggest themselves to those skilled in the art and may be made without departing from the spirit and scope of the invention. I, therefore, do not wish to restrict myself to the particular implementation illustrated and described, but desire to avail myself of all modifications that may fall within the scope of the appended claims.

Having thus described my invention, what I claim is:
1. A high-resolution vision system for an observer having a field of view related to a predetermined reference axis comprising:
   a helmet worn on the head of the observer;
   apparatus on said helmet for mounting eye-tracking display means having an image presentation which is slaved to the eye line of sight of the observer;
   a remote source of visual information including at least a first and a second pick-up sensor;
   servo means for adjusting the orientation of said remote source with respect to said reference axis, the angular orientation thereof with respect to said axis being related to the angular orientation of said helmet and the eye angle of said observer;
   communications means between said remote source and said helmet-mounted display means for transmitting visual information signals and control signals therebetween;
   at least a first and a second light projecting means in said display means for producing light-information signals in response to visual information derived from said remote source;
   means inserting said light signals from said first projecting means into a selected area of said light signals from said second light projecting means;
   angularly adjustable optical means in said display means for superimposing the combined image of said light signals of the field of view of the observer by directing light carrying said signals into at least one eye of the observer with the area of the inserted image having a predetermined relationship with said line of sight;
   monitoring means operatively associated with said helmet for measuring angular displacement thereof with respect to said reference axis and for producing control signals indicative of such angular displacement;
   monitoring means operatively associated with said display means for measuring angular displacement of said optical superimposing means with respect to said eye line of sight and for producing control signals indicative of such angular displacement;
   means responsive to said control signals from said eye line of sight monitoring means for adjusting the orientation of said optical superimposing means such that the orientation of said light information signals viewed by the observer remains substantially constant with respect to said eye line of sight; and
   means responsive to the control signals from both said eye line of sight monitoring means and said helmet angle monitoring means for adjusting the angular orientation of said remote visual information source such that the angular orientation thereof remains substantially constant with respect to said line of sight.

2. The high-resolution vision system as defined in claim 1 wherein the angularly adjustable optical means is a beamsplitter and wherein the angular adjustment thereof is by servo means responsive to the control signals from the line of sight monitoring means.

3. The high-resolution vision system as defined in claim 1 wherein the angular orientation of the remote visual information source with respect to the predetermined reference axis is the algebraic sum of the helmet angle and the eye angle.

4. The high-resolution vision system as defined in claim 1 wherein the apparatus on the helmet mounts eye-tracking display means for each eye of the observer whereby binocular vision is attained.

5. The high-resolution vision system as defined in claim 1 wherein the remote visual information pick-up sensors are television cameras and wherein the light projecting means are cathode ray tubes.

6. The high-resolution vision system as defined in claim 5 wherein the remote pick-up sensors are responsive to infrared radiation.

7. The high-resolution vision system as defined in claim 5 wherein the first remote sensor is a television camera having a narrow field of view and the first light-projecting means associated therewith is a cathode ray tube and the second remote sensor is a television camera having a wide field of view and the second light-projecting means associated therewith is a cathode ray tube, wherein said second sensor and said first light-projecting means are inhibited and the light-information signals from said first narrow field of view remote sensor is processed through said second light-projecting means whereby a magnification of the display images is provided.

8. The high-resolution system as defined in claim 5 wherein the first pick-up sensor has a narrow field of view and the second pick-up sensor has a wide field of view such that, when the light signals from the cathode ray tube associated with said first sensor are inserted into the light signals from the cathode ray tube associated with said second sensor, the combined image thereof superimposed on the field of view of the observer will have an area of high resolution related to the eye line of sight of the observer.

9. The high-resolution vision system as defined in claim 8 wherein the high-resolution area of the combined image is on the center of the eye line of sight of observer.

10. The high-resolution vision system as defined in claim 8 wherein the first pick-up sensor has a field of view of five degrees and the second pick-up sensor has a field of view of 25°.

* * * * *